United States Patent [19]
Griffith et al.

[11] Patent Number: 5,919,298
[45] Date of Patent: Jul. 6, 1999

[54] METHOD FOR PREPARING HYDROPHOBIC FUMED SILICA

[75] Inventors: Phillip Joseph Griffith, Llandough; William Herron, South Glamorgan; Brian Robert Harkness; Rosemary Margaret Taylor, both of Vale of Glamorgan; David James Wilson, South Glamorgan, all of United Kingdom

[73] Assignee: Dow Corning Corporation, Midland, Mich.

[21] Appl. No.: 09/005,852

[22] Filed: Jan. 12, 1998

[51] Int. Cl.⁶ .................................................. C04B 14/04
[52] U.S. Cl. ........................... 106/490; 423/336; 423/337
[58] Field of Search ............................. 106/490; 423/336, 423/337

[56] References Cited

U.S. PATENT DOCUMENTS

| | | | |
|---|---|---|---|
| 2,802,850 | 8/1957 | Wetzel et al. | 106/490 |
| 3,015,645 | 1/1962 | Tyler | 260/46.5 |
| 3,122,520 | 2/1964 | Lentz et al. | 106/490 |
| 4,072,796 | 2/1978 | Reinhardt et al. | 428/405 |
| 5,009,874 | 4/1991 | Parmentier et al. | 423/335 |

FOREIGN PATENT DOCUMENTS

| | | | |
|---|---|---|---|
| 1110331 | 4/1968 | United Kingdom | C01B 33/18 |

*Primary Examiner*—David Brunsman
*Attorney, Agent, or Firm*—William F. Boley

[57] ABSTRACT

A method for the preparation of hydrophobic fumed silicas which are useful, for example, as reinforcing fillers in rubber compositions. The method comprises two steps, where in the first step an aqueous suspension of fumed silica is contacted with an organosilicon compound in the presence of a catalytic amount of an acid to effect hydrophobing of the fumed silica. In the preferred method the first step is conducted in the presence of a water miscible organic solvent which facilitates hydrophobing of the fumed silica with the organosilicon compound and the fumed silica has a BET surface area greater than 50 $m^2/g$. In the second step the aqueous suspension of the fumed silica is contacted with a water-immiscible organic solvent at a solvent to silica weight ratio greater than 0.1:1 to effect separation of the hydrophobic fumed silica from the aqueous phase. In a preferred process the hydrophobic fumed silica has a surface area within a range of about 100 $m^2/g$ to 750 $m^2/g$.

27 Claims, No Drawings

METHOD FOR PREPARING HYDROPHOBIC FUMED SILICA

BACKGROUND OF INVENTION

The present invention is a method for the preparation of hydrophobic fumed silicas which are useful as reinforcing fillers in rubber compositions. The method comprises two steps, where in the first step an aqueous suspension of fumed silica is contacted with an organosilicon compound in the aqueous phase in the presence of a catalytic amount of an acid to effect hydrophobing of the fumed silica thereby forming an aqueous suspension of a hydrophobic fumed silica. In a preferred method the first step further comprises the presence of a water-miscible organic solvent which facilitates the hydrophobing of the fumed silica with the organosilicon compound and the fumed silica has a BET surface area greater than 50 m$^2$/g. In the second step the aqueous suspension of the hydrophobic fumed silica is contacted with a water-immiscible organic solvent at a solvent to silica weight ratio greater than 0.1:1 to effect separation of the hydrophobic fumed silica from the aqueous phase. In a preferred process the hydrophobic fumed silica has a surface area within a range of about 100 m$^2$/g to 750 m$^2$/g.

Although hydrophobic fumed silicas prepared by the present method are useful in many applications such as reinforcing and extending filler in natural rubbers, thermal insulation, and as filler in floatation devices, they are particularly useful as reinforcing fillers in silicone rubber compositions. It is well known that silicone rubbers formed from the vulcanization of polydiorganosiloxane fluids or gums alone generally have low elongation and tensile strength properties. One means for improving the physical properties of such silicone rubbers involves the incorporation of a reinforcing silica filler such as fumed silica into the fluid or gum prior to curing. However, fumed silica has the tendency to interact with the polydiorganosiloxane fluid or gum causing a phenomenon typically referred to as "crepe hardening". A great deal of effort has been made in the past to treat the surface of reinforcing silica fillers with organosilanes or organosiloxanes to make the surface of the silica hydrophobic. This surface treatment reduces or diminishes the tendency of the compositions to crepe harden and improves the physical properties of the cured silicone rubber. Known processes for hydrophobing fumed silica contribute significantly to the cost of the fumed silica and therefore less costly methods of treating fumed silica are desired.

Lentz, U.S. Pat. No. 3,015,645, teaches the making of hydrophobic silica powders by reacting an organosilicon compound such as dimethyldichlorosilane or trimethylmethoxysilane with a silica organogel in the presence of an acidic catalyst to form a hydrophobic silica hydrogel. The hydrophobic silica hydrogel in the aqueous phase is contacted with a water-immiscible organic solvent to convert the hydrophobic silica hydrogel to a hydrophobic silica organogel which segregates into the organic phase.

Reinhardt et al., U.S. Pat. No. 4,072,796, describe a method where finely divided hydrophobic silica and silicates are prepared by precipitating of alkali silicate solutions with mineral acids or metal salt solutions and treated with organohalosilanes. The organohalosilane is a prepolycondensed organohalosilane or a mixture of prepolycondensed organohalosilanes.

Parmentier et al., U.S. Pat. No. 5,009,874, describe a method for making a hydrophobic precipitated silica useful as a reinforcing filler in silicone elastomers. In a first step the precipitated silica in aqueous suspension is hydrophobed with an organosilicon compound. In a second step a water-immiscible organic solvent is added to effect separation of the hydrophobic precipitated silica from the aqueous phase. The water immiscible organic solvent is added to the process at a volume(L) to weight (Kg) ratio of silica of from 1 to 5 and preferably from 1.5 to 4.5.

British Patent Specification No. 1,110,331 describes the hydrophobing of an aqueous suspension of fumed silica having a BET surface area of 50 m$^2$/g with a alkyl halogen silane and the subsequent flocculating in a water-immiscible organic liquid in quantities of from 0.01 to 1% based on the entire weight of the suspension. In the British Patent Specification the provided example describes adding 3 ml of toluene to an aqueous suspension comprising 300 g of hydrophobed silica which provides for a solvent to silica ratio of 0.01:1. The British Patent Specification does not describe the use of a polar organic solvent to facilitate hydrophobing of the fumed silica.

SUMMARY OF INVENTION

The present invention is a method for the preparation of hydrophobic fumed silicas which are useful, for example, as reinforcing fillers in rubber compositions. The method comprises two steps, where in the first step an aqueous suspension of fumed silica is contacted with an organosilicon compound in the presence of a catalytic amount of an acid to effect hydrophobing of the fumed silica. In the preferred method the first step is conducted in the presence of a water miscible organic solvent which facilitates hydrophobing of the fumed silica with the organosilicon compound and the fumed silica has a BET surface area greater than 50 m$^2$/g. In the second step the aqueous suspension of the fumed silica is contacted with a water-immiscible organic solvent at a solvent to silica weight ratio greater than 0.1:1 to effect separation of the hydrophobic fumed silica from the aqueous phase. In a preferred process the hydrophobic fumed silica has a surface area within a range of about 100 m$^2$/g to 750 m$^2$/g.

DESCRIPTION OF INVENTION

The present invention is a method for preparing a hydrophobic fumed silica. The method comprises:

(A) contacting an aqueous suspension of a fumed silica with (1) a catalytic amount of an acid and (2) an organosilicon compound selected from the group consisting of organosilanes described by formula $$R^1_a H_b SiX_{4-a-b}, \quad (1)$$

organosiloxanes described by formula $$R^2_n SiO_{(4-n)/2}, \quad (2)$$

and organodisilazanes described by formula $$(R^3_3 Si)_2 NH, \quad (3)$$

where each $R^1$ is an independently selected hydrocarbon radical comprising 1 to about 12 carbon atom, each $R^2$ is independently selected from the group consisting of hydrogen, chlorine, hydroxy, and hydrocarbon radicals comprising 1 to about 12 carbon atoms with the proviso that at least 50 mole percent of the $R^2$ substituents are hydrocarbon radicals, each $R^3$ is independently selected from the group consisting of chlorine, hydroxy, and hydrocarbon radicals comprising 1 to about 12 carbon atoms with the proviso that at least 50 mole percents of the $R^3$ substituents are hydrocarbon radicals, each X is independently selected from the group consisting of halogen, alkoxy radicals comprising 1 to about 12 carbon atoms, and acyloxy radicals comprising 1 to about 12 carbon atoms; a=1, 2, or 3; b=0 or 1; a+b=1, 2, or 3 with the proviso that when b=1 then a+b=2 or 3; and n is an integer from 2 to 3 inclusive, to form an aqueous suspension of a hydrophobic fumed silica and (B) contacting the aqueous suspension of the hydrophobic fumed silica with a water-immiscible organic solvent at a solvent to silica weight ratio greater than 0.1:1 thereby effecting separation of the hydrophobic fumed silica from the aqueous suspension.

In step (A) of the present method an aqueous suspension of a fumed silica is hydrophobed with an organosilicon compound. By "fumed silica" it is meant those high-surface area powdered silicas prepared by a pyrogenic process. Such pyrogenic processes can include the vapor-phase hydrolysis of halosilanes such as trichlorosilane and tetrachlorosilane in an electric arc furnace. Other methods can include vaporization of $SiO_2$, vaporization and oxidation of Si, and high temperature oxidation and hydrolysis of silicon compounds such as silicate esters. Preferred is a fumed silica prepared by the vapor-phase hydrolysis of a halosilane.

The BET surface area of the fumed silica used in the present method can generally be greater than 50 $m^2/g$ to greater than 1000 $m^2/g$. Preferred is when the fumed silica has a BET surface area of about 75 $m^2/g$ to 1000 $m^2/g$. A most preferred fumed silica for use in the present method, particularly when the fumed silica is to be used as a reinforcing filler in rubber compositions, has a BET surface area within a range of about 100 $m^2/g$ to 750 $m^2/g$.

The fumed silica is added to step (A) of the present method as an aqueous suspension. The concentration of fumed silica in the aqueous suspension is not critical and can be within a range of about 5 to 90 weight percent. Preferred is when the concentration of fumed silica in the aqueous suspension is within a range of about 10 to 50 weight percent. Most preferred is when the concentration of fumed silica in the aqueous suspension is within a range of about 10 to 30 weight percent.

In step (A) of the present method the aqueous suspension of fumed silica is contacted with one or more of the organosilicon compounds described by formulas (1), (2), and (3) in the presence of a catalytic amount of an acid. The acid catalyst can be, for example, a mineral acid such as hydrochloric, hydroiodic, sulfuric, nitric, benzene sulfonic, and phosphoric acid. When the organosilicon compound is, for example, a chlorosilane, the catalytic amount of the acid may be generated in situ by hydrolysis of the chlorosilane or the reaction of the chlorosilane directly with hydroxyls of the fumed silica. In step (A) it is only necessary that the acid be present in an amount sufficient to effect reaction of the organosilicon compound with the fumed silica. In step (A) it is preferred that the acid catalyst provide a pH less than about pH 6. More preferred is when the acid catalyst provides a pH less than about pH 3.

The temperature at which step (A) is conducted is not critical and can be within a range of about 20° C. to 250° C. Generally, it is preferred that step (A) be conducted at a temperature within a range of about 30° C. to 150° C. Step (A) can be conducted at the reflux temperature of the polar organic solvent or water-immiscible organic solvent when present.

During the conduct of step (A) it is preferred to add a water-miscible organic solvent in an amount sufficient to facilitate the hydrophobing of the fumed silica with the organosilicon compound. Preferred is when the water-miscible organic solvent comprises at least 10 weight percent of the aqueous suspension comprising the fumed silica. Even more preferred is when the water miscible organic solvent comprises about 15 to 50 weight percent of the aqueous suspension. Most preferred is when the water-miscible organic solvent comprises about 20 to 30 weight percent of the aqueous suspension. Suitable water-miscible solvents include, for example, alcohols such as ethanol, isopropanol, and tetrahydrofuran. Isopropanol is a preferred water-miscible organic solvent for use in the present method.

During the conduct of step (A) it may be desirable to add a surfactant to facilitate the reaction of the organosilicon compound with the fumed silica. The surfactant may be added in the presence or absence of any water-miscible organic solvent or water-immiscible organic solvent added to the method. Suitable surfactants include, for example, anionic surfactants such as dodecylbenzene sulfonic acid, nonionic surfactants such as polyoxyethylene(23)lauryl ether and $(Me_3SiO)_2MeSi(CH_2)_3(OCH_2CH_2)_7OMe$ where Me is methyl, and cationic surfactants such as N-alkyltrimethyl ammonium chloride.

In step (A) of the present method the fumed silica is reacted with one or more organosilicon compounds described by formulas (1), (2), and (3). In formula (1) each $R^1$ can be an independently selected hydrocarbon radical comprising 1 to about 12 carbon atoms. $R^1$ can be a saturated or unsaturated monovalent hydrocarbon radical. $R^1$ can be a substituted or non-substituted monovalent hydrocarbon radical. $R^1$ can be, for example, alkyl radicals such as methyl, ethyl, propyl, t-butyl, hexyl, heptyl, octyl, decyl, and dodecyl; alkenyl radicals such as vinyl, allyl, and hexenyl; substituted alkyl radicals such as chloromethyl, 3,3,3-trifluoropropyl, and 6-chlorohexyl; and aryl radicals such as phenyl, naphthyl, and tolyl. $R^1$ can be an organofunctional hydrocarbon radical comprising 1 to about 12 carbon atoms where, for example the functionality is mercapto, disulfide, polysulfide, amino, carboxylic acid carbinol ester, or amido. A preferred organofunctional hydrocarbon radical is one having disulfide or polysulfide functionality.

In formula (1) each X is independently selected from the group consisting of halogen, alkoxy radicals comprising 1 to about 12 carbon atoms, and acyloxy radicals comprising about 1 to 12 carbon atoms. When X is a halogen, it is preferred that the halogen be chlorine. When X is an alkoxy radical, X may be, for example, methoxy, ethoxy, and propoxy. When X is an acyloxy radical, X may be, for example, acetoxy. Preferred is where each X is selected from the group consisting of chlorine atoms and methoxy.

In formula (2) each $R^2$ is independently selected from the group consisting of hydrogen, chlorine, hydroxy, and hydrocarbon radicals comprising 1 to about 12 carbon atoms, with the proviso that at least 50 mole percent of the $R^2$ substituents are hydrocarbon radicals. $R^2$ can be the same as $R^1$ as described above. The organosiloxanes described by formula (2) can be, for example, linear or cyclic in structure. The viscosity of the organosiloxanes described by formula (2) is not limiting and can range from that of a fluid to a gum. Generally, higher molecular weight organosiloxanes will be cleaved by the acidic conditions of the present method allowing them to react with the fumed silica.

In formula (3) each $R^3$ is independently selected from the group consisting of chlorine, hydroxy, and hydrocarbon radicals comprising 1 to about 12 carbon atoms with the proviso that at least 50 mole percent of the $R^3$ substituents are hydrocarbon radicals. When $R^3$ is a hydrocarbon radicals, $R^3$ can be the same as those hydrocarbon radicals described for $R^1$. Preferred is when $R^3$ is methyl.

Examples of useful organosilicon compounds include diethyldichlorosilane, allylmethyldichlorosilane, methylphenyldichlorosilane, phenylethyldiethoxysilane, 3,3,3-trifluoropropylmethyldichlorosilane, trimethylbutoxysilane, sym-diphenyltetramethyldisiloxane, trivinyltrimethylcyclotrisiloxane, octamethylcyclotetrasiloxane, hexaethyldisiloxane, pentylmethyldichlorosilane, divinyldipropoxysilane, vinyldimethylchlorosilane, vinylmethyldichlorosilane, vinyldimethylmethoxysilane, trimethylchlorosilane, hexamethyldisiloxane, hexenylmethyldichlorosilane, hexenyldimethylchlorosilane, dimethylchlorosilane, dimethyldichlorosilane, hexamethyldisilazane, mercaptopropylmethyldimethoxysilane, bis{3-(triethoxysilyl)propyl}tetrasulfide, polydimethylcyclosiloxanes comprising 3 to about 20 dimethylsiloxy units and preferably 3 to about 7 dimethylsiloxy units; and trimethylsiloxy, dimethylchlorosiloxy, or hydroxydimethylsiloxy endblocked polydimethylsiloxane polymers having a viscosity within a range of about 1 mPa.s to 1,000 mPa.s at 25° C.

The amount of organosilicon compound added to the method is that sufficient to adequately hydrophobe the fumed silica to provide a hydrophobic fumed silica suitable for its intended use. Generally, the organosilicon compound should be added to the method in an amount such that there is at least 0.04 organosilyl unit per $SiO_2$ unit in the fumed silica. The upper limit of the amount of organosilicon compound added to the process is not critical since any amount in excess of the amount required to saturate the hydroxyls of the fumed silica will act as a solvent for the method.

In step (B) of the present method a water-immiscible organic solvent is added at a solvent to silica weight ratio greater than 0.1:1 to effect separation of the hydrophobic fumed silica from the aqueous suspension. In a preferred method, step (A) of the method is conducted and then step (B) is subsequently conducted. However, in the present method the water-immiscible organic solvent can be added prior to, simultaneously with, or subsequent to the addition of the organosilicon compound of step (A). In the first two situations the conversion of the fumed silica to a hydrophobic fumed silica is accompanied by a phase separation in which the hydrophobic fumed silica separates into the solvent phase.

For purpose of this invention any organic solvent immiscible with water can be employed. Suitable water-immiscible organic solvents include low molecular weight siloxanes such as hexamethyldisiloxane, octamethylcyclotetrasiloxane, diphenyltetramethyldisiloxane and trimethylsiloxy endblocked polydimethylsiloxane fluids. When a siloxane is employed as a solvent it may serve both as a solvent and as a reactant with the fumed silica. In addition, suitable water-immiscible organic solvents include aromatic hydrocarbons such as toluene and xylene; heptane, hexane, and other aliphatic hydrocarbon solvents; cycloalkanes such as cyclohexane; ethers such as diethylether and dibutylether; halohydrocarbon solvents such as methylene chloride, chloroform, ethylene chloride, and chlorobenzene; and ketones such as methylisobutylketone.

The amount of water-immiscible organic solvent added to the present method provides a solvent to silica weight ratio greater than 0.1:1. Preferred is a solvent to silica weight ratio within a range of about 0.1:1 to 10:1. Most preferred is a solvent to silica weight ratio within a range of about 1:1 to 5:1. The upper limit for the amount of water-immiscible solvent added to the method is limited only by economic considerations such as solvent cost, solvent recovery or disposal expense, and equipment capacity. However, at solvent to silica ratios greater than about 5:1 a portion of the hydrophobic fumed silica may be in emulsion making complete recovery of the hydrophobic fumed silica difficult. In the present method it is preferred that the solvent to silica ratio be such that flocculation of the hydrophobic fumed silica occurs. By "flocculation" it is meant that an aggregation of treated silica particles incorporating the water-immiscible organic solvent suspends as aggregates in the organic solvent phase, thereby creating a distinct boundary between the silica/solvent phase and aqueous phase and minimal or no emulsion layer is formed. Typically such flocculation can be achieved by a solvent to silica ratio within the preferred range of about 1:1 to 5:1.

It is preferred that the water-immiscible organic solvent have a boiling point below about 250° C. to facilitate its removal from the hydrophobic fumed silica. However, the boiling point of the water-immiscible organic solvent is not critical since the solvent may be removed from the hydrophobic silica by filtration, centrifuging, or other suitable means.

In step (B), the water-immiscible organic solvent is added to the method thereby effecting separation of the hydrophobic fumed silica from the aqueous suspension. The hydrophobic fumed silica is recovered in the solvent phase to provide a product which may be used, if desired, without further treatment. Alternatively, the hydrophobic fumed silica may be washed to reduce contaminates. The hydrophobic fumed silica may be recovered from the solvent, dried, and further treated by such methods as heating.

The following examples are provided to illustrate the present method. The examples are not intended to limit the claims herein.

Example 1

Fumed silica was hydrophobed with hexamethyldisiloxane. Into a 500 ml 20 flask were added 20 g of fumed silica (Cabot MS75D, BET surface area of 275 $m^2/g$, Cabot Corporation, Tuscola, Ill.), 200 g of distilled water, and 90 g of isopropanol to form a suspension. With constant stirring, 0.5 g of $FeCl_3$, 1 g of concentrated HCl, and 50 g of hexamethyldisiloxane were added to the suspension. The suspension was refluxed for 30 minutes with constant stirring. After cooling, the suspension was transferred to a separatory funnel containing 400 ml of toluene and 600 ml of water. Upon agitation the content of the separatory funnel formed a clear upper layer comprising a silica/solvent phase and a lower aqueous phase. About 300 ml of distilled water was trapped as emulsion between the upper and lower phases. The silica/solvent phase was recovered and washed three times with 100 ml aliquots of distilled water. Residual water was removed by azeotropic distillation and the hydrophobic fumed silica isolated by filtration. Residual solvent was removed from the hydrophobic fumed silica by heating at 130° C. for 24 hours. The dried hydrophobic fumed silica was determined to comprise 2.95 weight percent carbon by CHN analysis using a Perkin Elmer Model 2400 CHN Elemental Analyzer (Perkin Elmer Corporation, Norwalk, Conn.).

Example 2

Fumed silica was hydrophobed with dimethyldichlorosilane. Into a 100 ml flask were added 25 g of fumed silica (Cabot MS75D), 281 g of distilled water, and 90 g of isopropanol to form a suspension. With stirring, 11 g of dimethyldichlorosilane were added to the mixture over a 3 minute period. The suspension was heated to reflux for 30 minutes with constant stirring. After cooling, 300 ml of toluene were added to the flask and the flask content stirred to effect transfer of the hydrophobic fumed silica into the toluene phase. The toluene phase was recovered and washed three times with 300 ml aliquots of distilled water with gentle mixing to avoid formation of an emulsion phase. Residual water was removed by azeotropic distillation and the hydrophobic fumed silica separated from the toluene by distillation. Residual solvent was removed from the hydrophobic fumed silica by heating at 130° C. for 24 hours. The dried hydrophobic fumed silica was determined to comprise 5.37 weight percent carbon by CHN analysis.

Example 3

Fumed silica was hydrophobed with hexamethyldisiloxane. Into a 5 L flask were added 180 g of fumed silica (Cabot MS75D), 803 g of distilled water, 179 g of concentrated HCl, 316 g of isopropanol, and 150 g of hexamethyldisiloxane. The resulting suspension was refluxed for 1 hour. After cooling of the suspension, toluene was slowly added to the suspension and the consistency of the suspension visually observed as a function of added toluene. After the addition of 154 g of toluene a noticeable drop in viscosity of the suspension was noted. After a total of 174 g of toluene had been added the suspension began to flocculate forming dough-like clumps in the suspending aqueous phase. Significant clumping was visible after a total addition of 188 g of toluene. After a total addition of 205 g of toluene the clumps began to disappear forming a uniform phase on the surface of the aqueous phase. Further solvent addition functioned to reduce the viscosity of the silica/solvent slurry to yield a uniform suspension of the hydrophobic fumed silica.

Example 4

Fumed silica was hydrophobed with hexamethyldisiloxane, with excess hexamethyldisiloxane serving as a water-immiscible organic solvent. Into a 5 L flask were added 180 g of fumed silica (Cabot MS75D), 821 g of distilled water, 200 g of concentrated HCl, 336 g of isopropanol, and 350 g of hexamethyldisiloxane to form a suspension. The suspension was heated to reflux and along with stirring. As the suspension was refluxed the viscosity began to rise and as the fumed silica was hydrophobed silica flocculation began to occur in the excess hexamethyldisiloxane. After cooling the mixture was allowed to separate into two phase and the organic phase separated from the aqueous phase. 1.5 L of distilled water were added to the organic phase and stirring continued for 30 minutes. The organic phase was washed with 1.5 L of distilled water containing about 1.5 g of sodium bicarbonate and then washed with three 1.5 L aliquots of distilled water. During the washing steps a further 242 g of hexamethyldisiloxane were added to the hydrophobic fumed silica flocculate to maintain a soft consistency. The flocculated hydrophobic fumed silica was separated from the hexamethyldisiloxane by evaporation at room temperature. The hydrophobic fumed silica was dried in an oven at 130° C. for 24 hours. The dried hydrophobic fumed silica was determined to comprise 1.64 weight percent carbon by CHN analysis.

Example 5

Fumed silica was hydrophobed with octamethylcyclotetrasiloxane (D4) and flocculated with hexamethyldisiloxane serving as a water-immiscible organic solvent. Into a 5 L flask were added 180 g of fumed silica (Cabot MS75D), 820 g of distilled water, 180 g of concentrated HCl, 333 g of isopropanol, and 50 g of octamethylcyclotetrasiloxane to form a suspension. The suspension was heated to reflux for 30 minutes, with stirring. After cooling the suspension, 700 ml of hexamethyldisiloxane were added to the mixture to flocculated the hydrophobed fumed silica and the aqueous phase removed by decantation. 1.5 L of distilled water were added to the organic phase and stirring continued for 30 minutes. The organic phase was washed with 1.5 L of distilled water containing about 1.5 g of sodium bicarbonate and then washed with three 1.5 L aliquots of distilled water. The flocculated hydrophobic fumed silica was separated from the hexamethyldisiloxane by evaporation at room temperature. The hydrophobic fumed silica was dried in an oven at 130° C. for 24 hour and the weight percent carbon (Wt. % C) as determined by CHN analysis is reported in Table 1. This procedure was repeated with octamethylcyclotetrasiloxane levels of 25, 90, and 130 g, with the reagent levels and flocculation solvent and quantities used recorded in Table 1. The weight percent carbon of the dried hydrophobic fumed silica, as determined by CHN analysis, is also reported in Table 1.

TABLE 1

Treatment of Fumed Silica With Octamethylcyclotetrasiloxane

| Treating Agent | Wt. treating Agent (g) | Silica (g) | Water (g) | HCl (g) | IPA | Floc. Solvent | Floc. Solvent (g) | Wt. % C |
|---|---|---|---|---|---|---|---|---|
| D4 | 25 | 180 | 823 | 179 | 333 | HMDS* | 722 | 3.56 |
| D4 | 50 | 180 | 820 | 180 | 333 | HMDS | 700 | 6.38 |
| D4 | 90 | 180 | 824 | 181 | 333 | HMDS | 583 | 9.28 |
| D4 | 130 | 180 | 823 | 181 | 333 | HMDS | 426 | 9.53 |

*HMDS—Hexamethyldisiloxane

Example 6

Fumed silica was hydrophobed with dimethyldichlorosilane and flocculated with various water-immiscible organic solvents. Into a 5 L flask were added 180 g of fumed silica (Cabot MS75D), 1000 g of distilled water, and 333 g of isopropanol to form a suspension. The suspension was refluxed for 30 minutes. After cooling the suspension to room temperature, hexamethyldisiloxane was added to flocculate the hydrophobic fumed silica. The aqueous phase was removed by decantation and the organic phase washed with 1.5 L of distilled water by stirring for 30 minutes. The organic phase was neutralized with 1.5 L of water containing about 1.5 g of sodium bicarbonate and then washed with three 1.5 L aliquots of distilled water. During the washing step additional hexamethyldisiloxane was added to maintain a soft flocculate consistency. The flocculated hydrophobic fumed silica was separated from the hexamethyldisiloxane by evaporation at room temperature. The hydrophobic fumed silica was dried in an oven at 130° C. for 24 hours and the weight percent carbon as determined by CHN analysis is reported in Table 2. This procedure was repeated with the dimethyldichlorosilane levels reported in Table 2 and with the reagent levels and flocculation solvents and quantities reported in Table 2 as well as the weight percent carbon as determined by CHN analysis.

TABLE 2

Treatment of Fumed Silica With Dimethyldichlorosilane

| Wt. Treating Agent (g) | Floc. Solvent | Floc. Solvent (g) | Wt. % C |
|---|---|---|---|
| 35 | HMDS* | 663 | 3.31 |
| 51 | HMDS | 570 | 3.94 |
| 60 | Hexane | 900 | 4.22 |
| 70 | Hexane | 586 | 5.19 |
| 76 | HMDS | 482 | 5.11 |
| 80 | Hexane | 570 | 5.66 |
| 90 | Hexane | 429 | 7.18 |
| 100 | HMDS | 400 | 6.17 |
| 135 | HMDS | 428 | 7.87 |
| 183 | HMDS | 436 | 9.27 |

*Hexamethyldisiloxane

Example 7

Fumed silica was hydrophobed with a mixture of hexenyldimethylchlorosilane and dimethyldichlorosilane. Into a 100 ml flask were added 25 g of fumed silica (Cabot MS75D), 289 g of distilled water, and 90 g of isopropanol to form a suspension. A mixture comprising 8 g of dimethyldichlorosilane and 2 g of hexenyldimethylchlorosilane was added drop-wise to the suspension over a 3 minute period. With stirring, the suspension was heated to reflux for 30 minutes and then cooled. To the cooled suspension was then added cyclohexane to effect flocculation of the hydrophobic fumed silica. After the addition of 76 g of cyclohexane a flocculate having an average particle size of about 0.5 mm was obtained. After the addition of 76 g of cyclohexane the flocculate had an average particle size of about 2 mm. Further additions of cyclohexane resulted in mass clumping of the flocculate. After the addition of 90 g of cyclohexane, the aqueous phase was removed by decantation and the organic phase containing the flocculate was washed with 500 ml of distilled water followed by washing with 500 ml of distilled water containing 0.5 g of sodium bicarbonate. The flocculate was than washed with two additional 500 ml aliquots of distilled water and then air dried. The air dried flocculate comprising the hydrophobic fumed silica was then further dried in an oven at 130° C. for 24 hours. The dried hydrophobic fumed silica was determined to comprise 3.83 weight percent carbon by CHN analysis.

Example 8

Fumed silica was hydrophobed with chlorine end-blocked polydimethylsiloxane oligomers. Into a 5 L flask were placed 180 g of fumed silica (Cabot MS75D), 1000 g of distilled water, and 333 g of isopropanol to form a suspension. Then, 75 g of chlorine end-blocked polydimethyldisiloxane having an average dp of 12 were added to the suspension. The suspension was heated to 60° C. and an additional 108 g of the chlorine end-blocked polydimethyldisiloxane were added. The suspension was heated to 75° C. of 15 minutes and then cooled. To the suspension were added 474 g of hexamethyldisiloxane to effect flocculation of the hydrophobic fumed silica. The aqueous phase was removed and the solvent phase containing the flocculated hydrophobic fumed silica washed twice with 1500 g of distilled water. The solvent phase containing the hydrophobic fumed silica flocculate was allowed to air dry and the hydrophobic fumed silica further dried in an oven at 150° C. for 24 hour.

Example 9

Fumed silica was contacted with dimethyldichlorosilane in the absence of a water miscible solvent. Into a 5 L flask were added 150 g of fumed silica (Cabot MS75D) and 1500 g of water to form a suspension. The suspension was heated to 70° C. and then 60 g of dimethyldichlorosilane were added over a 10 minute period with stirring. The suspension was cooled to room temperature and 500 g of toluene slowly added to the suspension. No flocculation of the fumed silica was observed. The suspension was air dried. The dried fumed silica was determined to comprise 4.1 weight percent carbon by CHN analysis.

Example 10

Fumed silica was hydrophobed with methyltrichlorosilane and hexamethyldisilazane. Into a 5 L flask were added 110 g of fumed silica (Cabot MS75D), 610 g of water, and 204 g of isopropanol to form a suspension. Then, 118 g of methyltrichlorosilane were added drop-wise to the suspension over a three minute period. With stirring, the suspension was heated to reflux for 30 minutes and then cooled. To the cooled suspension were added 360 g of hexane in order to effect partical flocculation of the silica. Complete flocculation of the silica was achieved by the addition of 30 g of hexamethyldisilazane and a further addition of 40 g of cyclohexane. Following the second addition of cyclohexane, the aqueous phase was removed by decantation and the organic phase containing the flocculate was washed with 500 ml of distilled water followed by washing with 500 ml of distilled water containing 0.5 g of sodium bicarbonate. The flocculate was then washed with two additional 500 ml aliquots of distilled water and air dried. The air-dried flocculate comprising the hydrophobic fumed silica was further dried in an oven at 130° C. for 24 hours. The dried hydrophobic fumed silica was determined to comprise 6.09 weight percent carbon by CHN analysis.

We claim:

1. A method for preparing a hydrophobic fumed silica comprising (A) contacting an aqueous suspension of a fumed silica with (1) a catalytic amount of an acid and (2) an organosilicon compound selected from the group consisting of organosilanes described by formula $R^1_a H_b SiX_{4-a-b}$, organosiloxanes described by formula $R^2_n SiO_{(4-n)/2}$, and organodisilazanes described by formula $(R^3_3Si)_2NH$, where each $R^1$ is an independently selected hydrocarbon radical comprising 1 to about 12 carbon atom, each $R^2$ is independently selected from the group consisting of hydrogen, chlorine, hydroxy, and hydrocarbon radicals comprising 1 to about 12 carbon atoms with the proviso that at least 50 mole percent of the $R^2$ substituents are hydrocarbon radicals, each $R^3$ is independently selected from the group consisting of chlorine, hydroxy, and hydrocarbon radicals comprising 1 to about 12 carbon atoms with the proviso that at least 50 mole percent of the $R^3$ substituents are hydrocarbon radicals, each X is independently selected from the group consisting of halogen, alkoxy radicals comprising 1 to about 12 carbon atoms, and acyloxy radicals comprising 1 to about 12 carbon atoms, a=1, 2, or 3; b=0 or 1; a+b=1, 2, or 3 with the proviso that when b=1 then a+b=2 or 3; and n is an integer from 2 to 3 inclusive, to form an aqueous suspension of a hydrophobic fumed silica and (B) contacting the aqueous suspension of the hydrophobic fumed silica with a water-immiscible organic solvent at a solvent to silica weight ratio greater than 0.1:1 thereby effecting separation of the hydrophobic fumed silica from the aqueous suspension.

2. A method according to claim 1, where the fumed silica has a BET surface area greater than 50 m²/g.

3. A method according to claim 1, where the fumed silica has a BET surface area within a range of about 75 m²/g to 1000 m²/g.

4. A method according to claim 1, where the fumed silica has a BET surface area within a range of about 100 m²/g to 750 m²/g.

5. A method according to claim 1, where the aqueous suspension of step (A) further comprises a water-miscible organic solvent in an amount sufficient to facilitate reaction of the fumed silica with the organosilicon compound.

6. A method according to claim 1, where the organosilicon compound is selected from the group consisting of methyltrichlorosilane, dimethyldichlorosilane, and hexamethyldisilaaane.

7. A method for preparing a hydrophobic fumed silica comprising (A) contacting an aqueous suspension comprising fumed silica having a surface area within a range of about 75 m²/g to 1000 m²/g and a water-miscible organic solvent in an amount sufficient to facilitate reacting the fumed silica with an organosilicon compound with (1) a catalytic amount of an acid and (2) an organosilicon compound selected from the group consisting of organosilanes described by formula

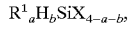

organosiloxanes described by formula

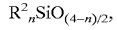

and organodisilazanes described by formula

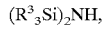

where each $R^1$ is an independently selected hydrocarbon radical comprising 1 to about 12 carbon atom, each $R^2$ is independently selected from the group consisting of hydrogen, chlorine, hydroxy, and hydrocarbon radicals comprising 1 to about 12 carbon atoms with the proviso that at least 50 mole percent of the $R^2$ substituents are hydrocarbon radicals, each $R^3$ is independently selected from the group consisting of chlorine, hydroxy, and hydrocarbon radicals comprising 1 to about 12 carbon atoms with the proviso that at least 50 mole percent of the $R^3$ substituents are hydrocarbon radicals, each X is independently selected from the group consisting of halogen, alkoxy radicals comprising 1 to about 12 carbon atoms, and acyloxy radicals comprising 1 to about 12 carbon atoms, a=1, 2, or 3; b=0 or 1; a+b=1, 2, or 3 with the proviso that when b=1 then a+b=2 or 3; and n is an integer from 2 to 3 inclusive to form an aqueous suspension of a hydrophobic fumed silica and (B) contacting the aqueous suspension of the hydrophobic fumed silica with a water-immiscible organic solvent at a solvent to silica weight ratio greater than 0.1:1 thereby effecting separation of the hydrophobic fumed silica from the aqueous suspension.

8. A method according to claim 7, where the fumed silica is prepared by the vapor-phase hydrolysis of a halosilane.

9. A method according to claim 7, where the fumed silica has a BET surface area of within a range of about 100 m²/g to 750 m²/g.

10. A method according to claim 7, where the concentration of the fumed silica in the aqueous suspension is within a range of about 5 to 90 weight percent.

11. A method according to claim 7, where the concentration of the fumed silica in the aqueous suspension is within a range of about 10 to 30 weight percent.

12. A method according to claim 7, where the catalytic amount of the acid provides for a pH less than about pH 3 during the contacting of step (A).

13. A method according to claim 7, where the contacting of step (A) is effected at a temperature within a range of about 30° C. to 150° C.

14. A method according to claim 7, where the water-miscible organic solvent comprises at least 10 weight percent of the aqueous suspension.

15. A method according to claim 7, where the water-miscible organic solvent comprises about 15 to 50 weight percent of the aqueous suspension.

16. A method according to claim 7, where the water-miscible organic solvent comprises about 20 to 30 weight percent of the aqueous suspension.

17. A method according to claim 7, where the water-miscible organic solvent is isopropanol.

18. A method according to claim 7, where the contacting of step (A) is conducted in the presence of a surfactant which facilitates reaction of the organosilicon compound with the fumed silica.

19. A method according to claim 7, where the organosilicon compound is added in an amount such that there is at least 0.04 organosilyl unit per $SiO_2$ unit in the fumed silica.

20. A method according to claim 7, where the water-immiscible organic solvent is added at a solvent to silica ratio within a range of greater than about 0.1:1 to 10:1.

21. A method according to claim 7, where the water-immiscible organic solvent is added at a solvent to silica ratio within a range of about 1:1 to 5:1.

22. A method according to claim 21, where the water-immiscible organic solvent is selected from the group consisting of toluene, hexane, cyclohexane, hexamethyldisiloxane, and octamethylcyclotetrasiloxane.

23. A method according to claim 7, where the organosilicon compound is an organosilane.

24. A method according to claim 7, where the organosilicon compound is an organosiloxane.

25. A method according to claim 7, where the organosilicon compound is an organodisilazane.

26. A method according to claim 7, where the organosilicon compound is selected from the group consisting of methyltrichlorosilane, dimethyldichlorosilane, and hexamethyldisilazane.

27. A method for preparing a hydrophobic fumed silica comprising (A) contacting an aqueous suspension comprising 10 to 30 weight percent fumed silica having a surface area within a range of about 75 m²/g to 1000 m²/g and 20 to 30 weight percent of a water-miscible organic solvent which facilitates reacting the fumed silica with an organosilicon compound with (1) a catalytic amount of an acid and (2) an organosilicon compound selected from the group consisting of organosilanes described by formula $$R^1_a H_b SiX_{4-a-b},$$

and organosiloxanes described by formula $$R^2_n SiO_{(4-n)/2},$$

and organodisilazanes described by formula $$(R^3_3Si)_2NH,$$

where each $R^1$ is an independently selected hydrocarbon radical comprising 1 to about 12 carbon atom, each $R^2$ is independently selected from the group consisting of hydrogen, chlorine, hydroxy, and hydrocarbon radicals comprising 1 to about 12 carbon atoms with the proviso that at least 50 mole percent of the $R^2$ substituents are hydrocarbon radicals, each $R^3$ is independently selected from the group consisting of chlorine, hydroxy, and hydrocarbon radicals comprising 1 to about 12 carbon atoms with the provise that a least 50 mole percent of the $R^3$ substituents are hydrocarbon radicals, each X is independently selected from the group consisting of halogen, alkoxy radicals comprising 1 to about 12 carbon atoms, and acyloxy radicals comprising 1 to about 12 carbon atoms, a=1, 2, or 3; b=0 or 1; a+b=1, 2, or 3 with the proviso that when b=1 then a+b=2 or 3; and n is an integer from 2 to 3 inclusive to form an aqueous suspension of a hydrophobic fumed silica and (B) contacting the aqueous suspension of the hydrophobic fumed silica with a water-immiscible organic solvent at a solvent to silica weight ratio within a range of about 1:1 to 5:1 thereby effecting separation of the hydrophobic fumed silica from the aqueous suspension.

* * * * *